(12) United States Patent
Gedrich et al.

(10) Patent No.: US 6,473,952 B1
(45) Date of Patent: Nov. 5, 2002

(54) DEBURRER DEVICE

(76) Inventors: Charles J. Gedrich, 935 Sheffield Ave., Dyer, IN (US) 46311; Donald Berchem, P.O. box 1843, La Porte, IN (US) 46352

(*) Notice: Subject to any disclaimer, the term of this patent is extended or adjusted under 35 U.S.C. 154(b) by 0 days.

(21) Appl. No.: 09/687,945

(22) Filed: Oct. 13, 2000

(51) Int. Cl.$^7$ .............................. B23D 17/00; B23D 1/22
(52) U.S. Cl. ...................... 29/33 A; 409/300; 409/301
(58) Field of Search .................. 29/33 A; 409/298, 409/299, 300, 301, 293, 319, 329, 308

(56) References Cited

U.S. PATENT DOCUMENTS

| | | |
|---|---|---|
| 4,362,448 A | 12/1982 | Hasebe et al. |
| 4,390,167 A * | 6/1983 | Ito et al. .................. 29/33 A X |
| 4,522,540 A | 6/1985 | Hasebe et al. |
| 4,610,586 A | 9/1986 | Langeder |
| 4,672,726 A | 6/1987 | Delbedz et al. |
| 4,859,126 A | 8/1989 | Mancuso |
| 4,874,274 A | 10/1989 | Mancuso |
| 5,179,772 A | 1/1993 | Braun et al. |
| 5,253,398 A | 10/1993 | Markiewicz |
| 5,259,440 A * | 11/1993 | Lotz et al. .............. 409/301 X |
| 5,435,064 A | 7/1995 | Brookfield |
| 5,626,181 A * | 5/1997 | Lotz et al. .............. 409/298 X |
| 5,765,271 A | 6/1998 | Lotz et al. |
| 5,865,294 A | 2/1999 | Betz |
| 5,876,162 A | 3/1999 | Mancuso et al. |
| 6,070,311 A | 6/2000 | Lotz |

FOREIGN PATENT DOCUMENTS

| | | | |
|---|---|---|---|
| DE | 2849208 | * 11/1978 | ................. 409/300 |
| JP | 0021712 | * 2/1981 | ................. 409/301 |
| JP | 59-7468 | * 1/1984 | ................. 29/33 A |
| JP | 4-147756 | * 5/1992 | ................. 29/33 A |
| JP | 8-141714 | * 6/1996 | ................. 29/33 A |
| JP | 11-277322 | * 10/1999 | ................. 29/33 A |

* cited by examiner

Primary Examiner—William Briggs
(74) Attorney, Agent, or Firm—Robert F. Kemp; John G. Premo

(57) ABSTRACT

An apparatus for removing dross from the bottom front and back edges of torch cut slabs of continuous cast steel being conveyed upon a line of rollers. It has at least one blade support mounted upon a rotatable powered spindle journaled in bearings at an interior angle of about 6 degrees–15 degrees. It also has a pair of opposed parallel dross removing blades. Their front edges have a downwardly sloped flat top and a 90 degree vertical end. There is at least one vertical dross cutting blade mounted on the blade support at an angle perpendicular to the line of rollers and extending beyond the vertical end of the dross removing blades. Control means rotate the spindle sufficiently to remove any dross that has fallen thereon. Also disclosed is a method for using the apparatus.

20 Claims, 9 Drawing Sheets

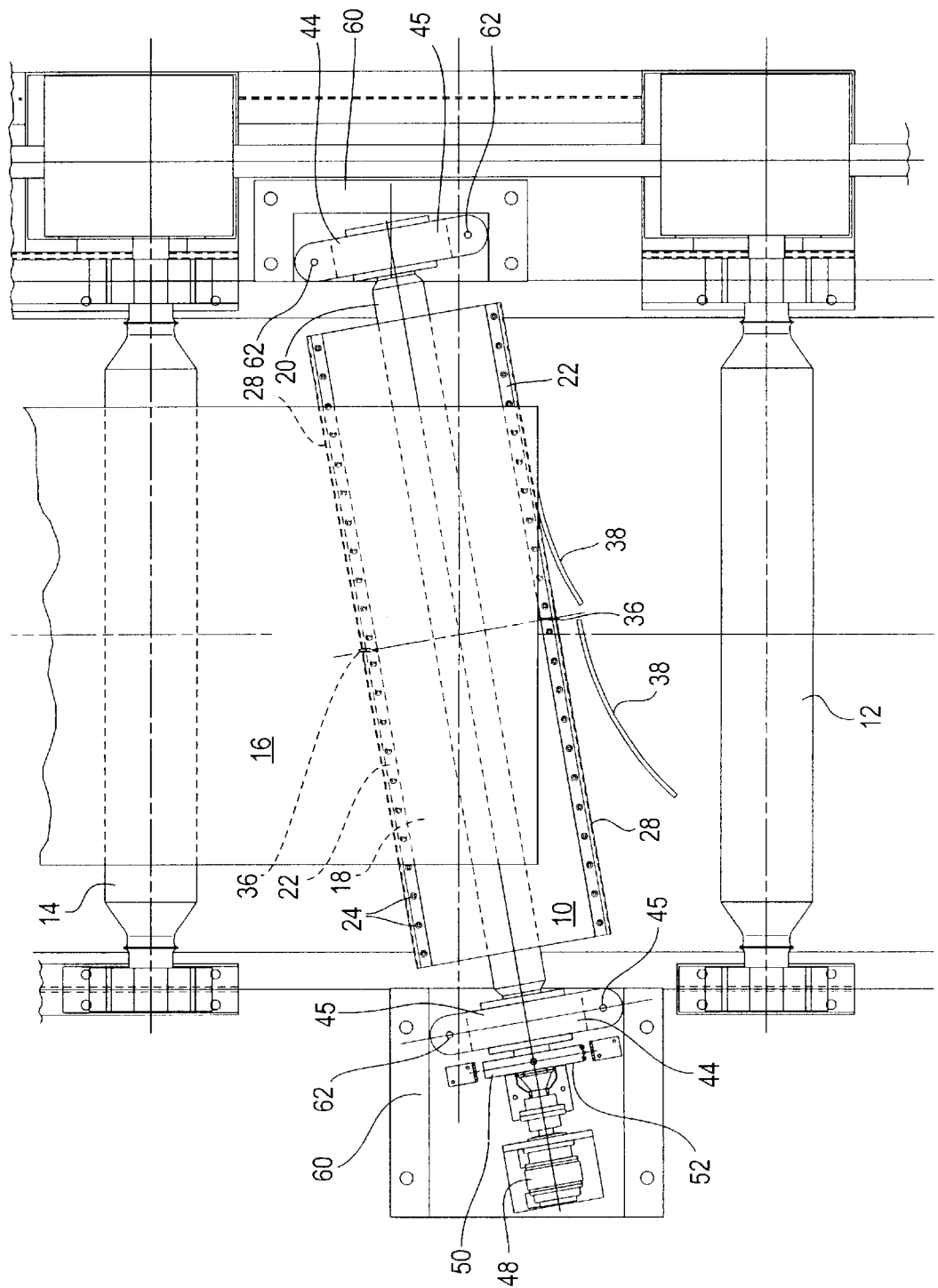

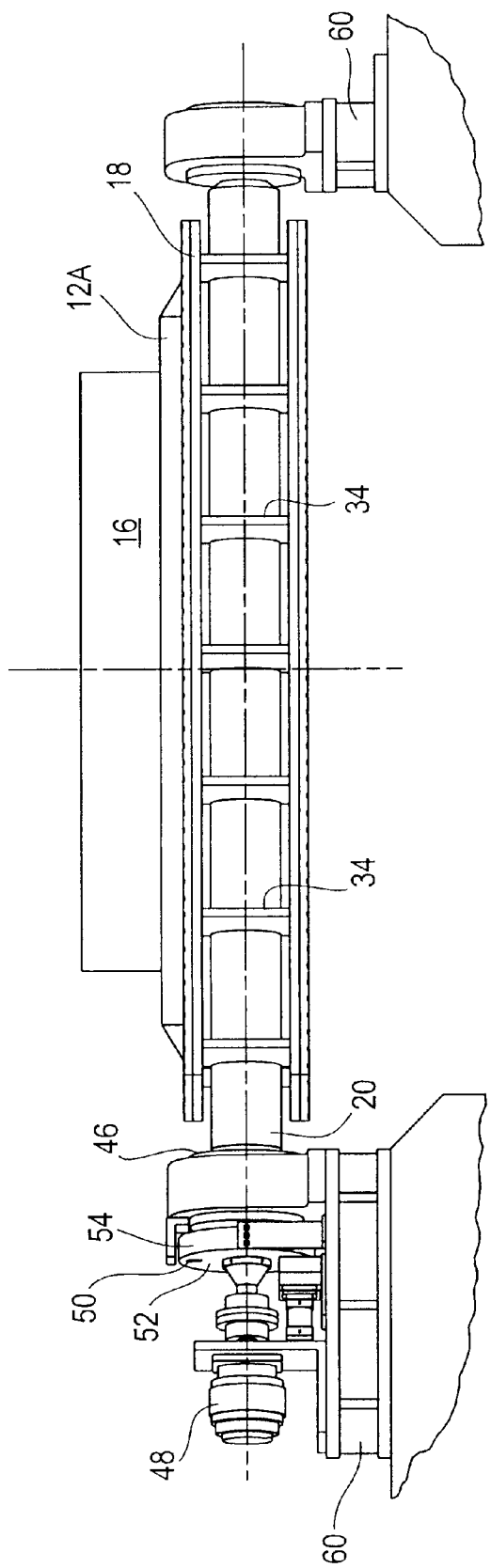

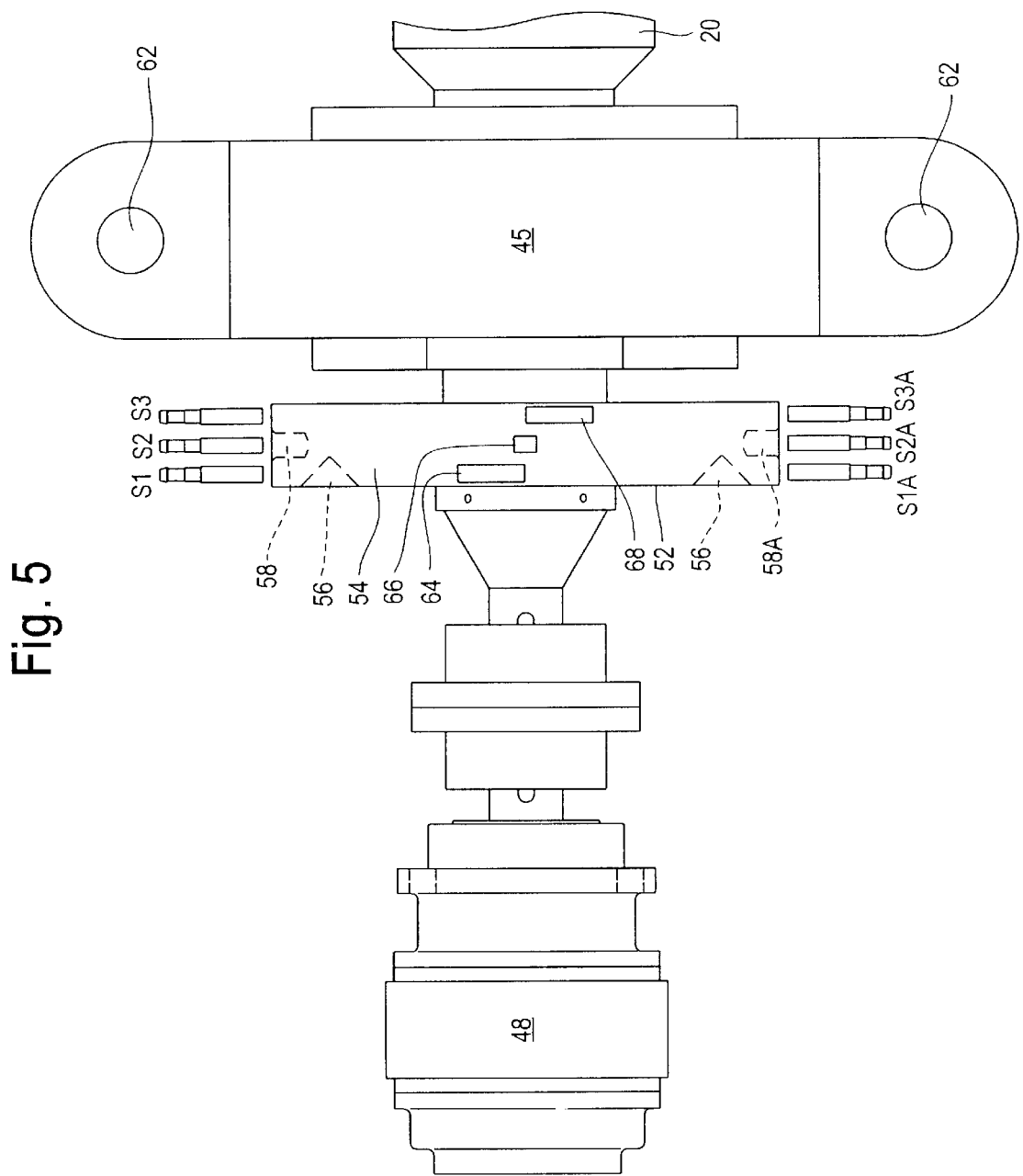

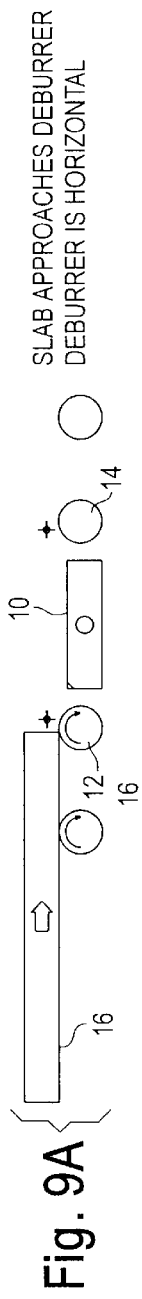
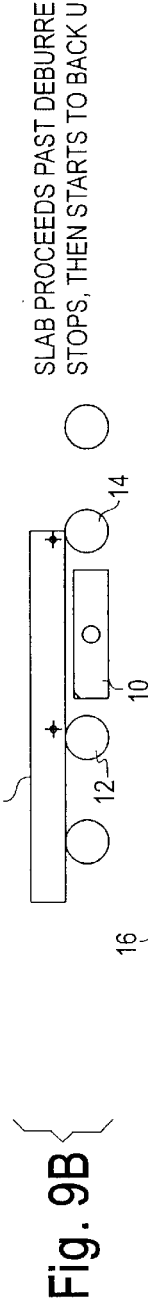
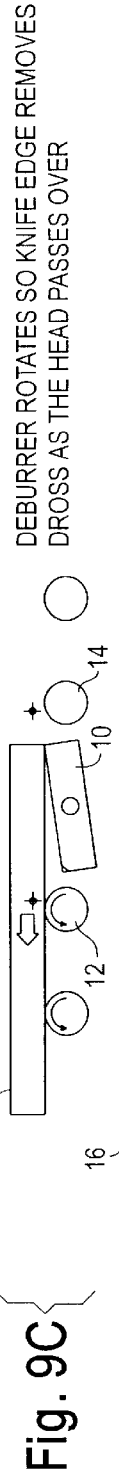
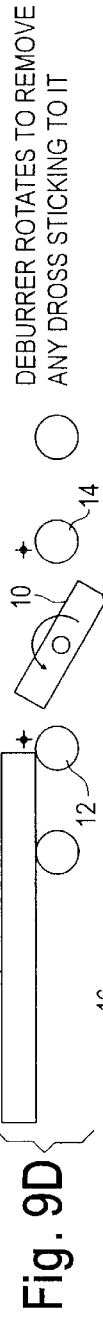
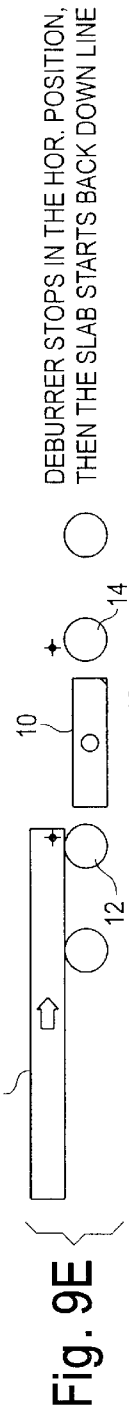
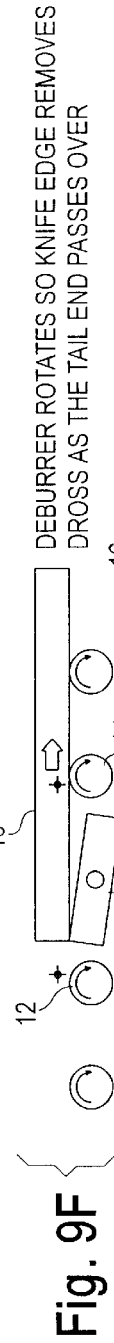
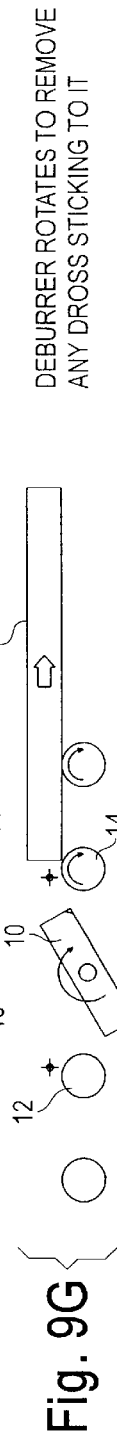
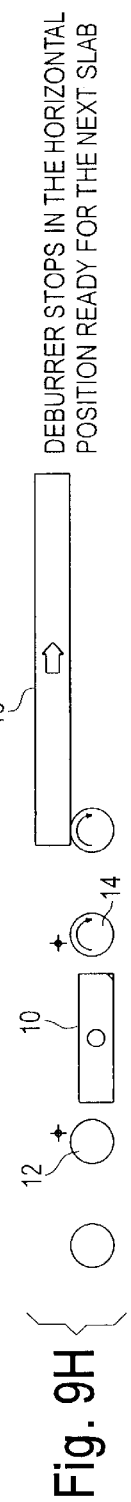

DEBURRER DEVICE

FIELD OF THE INVENTION

The invention relates to a device for removing dross from steel slabs.

BACKGROUND OF THE INVENTION

The present invention relates to an apparatus and method for removing dross ridges from the bottom of steel slabs.

DESCRIPTION OF THE PRIOR ART

In the production of steel by the continuous casting process, the continuous cast length of steel emerging from the caster is cut into slabs to form separate rectangular flat bottomed pieces. The slabs are conveyed from the cutting operation to storage or further processing by means of computer controlled, motor powered, horizontal, parallel, spaced apart rollers, which are capable of moving the slab in a forward or reverse direction. The produced slabs are then subjected to subsequent processing, as by rolling, to form a finished steel product.

The cutting operation to produce slabs as described above is conventionally performed by means of an oxygen torch, wherein a jet of high purity oxygen is directed against the work piece while it is heated to the oxygen ignition temperature. The resulting exothermic chemical reaction between the iron and oxygen produces slag or waste, which consists of iron oxide, metallic iron and other alloy elements. This slag or waste is in the molten state, and it is displaced during the cutting operation and a portion thereof forms a ridge of the material along the lower edge of the cut end. Upon cooling, the waste solidifies and adheres to the slab along the bottom surface adjacent to the cut end, and forms what is commonly called a "dross ridge."

The formation of the dross ridges on the slabs presents problems in the further processing of the slab. For example, a dross ridge may drop off in the reheat furnace, which requires that it then be removed, thus involving additional labor. Also, in the event that the dross ridge remains adhered to the slab during reheating, it is laminated into the steel during rolling, resulting in an inferior product.

The dross ridges resulting from the torch cutting operation have been removed by a process involving inverting the slab and removing the dross ridges with scarfing torches. However, this process required additional handling of the slab and necessitated additional equipment and labor. Mechanical chippers or chisels have been employed for this purpose, but this also is a labor-intensive process.

More recently, there has been introduced to the art devices that are inserted into the line of rollers conveying the dross containing slab. These devices contain chisel edge cutting blades that sit beneath the slabs. The slab is passed over blades that cut the dross. The cutting blades pivot on a shaft, using a motor or a hydraulic cylinder and levers. Other schemes using cutting blades have been proposed. These cutting devices are used with dross disposal chutes that funnel the dross into receiving bins immediately after removal. In the case of large slabs, the dross removed is in the form of elongated strips that rapidly fill the disposal chutes and receiving bins and, unless frequently removed, can jam the roller line or damage the dross removing apparatus.

The prior art devices as described above all use chiseled edge or other configured dross removal blades. In the case of chiseled edge blades, the first irregularity present in the dross causes the sharp edge of the blade to dig into the metal and rotate upward. This results in more steel being removed than necessary. Also, in a short time the blades become dull and require sharpening.

It would be an advance in the art to provide an improved dross cutting apparatus that minimized cutting of good steel while simultaneously removing the dross. Additionally, it would not employ metal gouging sharp edged blades. Also another improvement would be to cut the dross into smaller pieces while it is removed from slabs to increase bin storage capacity. Further, it would be an advantage to accurately position the means for leveling the device horizontally, and holding the apparatus stationary between dross removal cycles and a lock to prevent the turning of the apparatus during servicing and maintenance.

SUMMARY OF THE INVENTION

The invention comprises an apparatus for removing dross from the bottom front and back edges of torch cut slabs of continuous cast steel being conveyed upon a line of rollers. The slabs treated by the apparatus of the invention are flat bottomed and are substantially free from warping or other defects. The apparatus comprises at least one blade support mounted upon a motor driven rotatable spindle. This spindle is horizontally positioned below and between two adjacent slab-conveying rollers. The spindle is journaled in bearings and is mounted at an interior angle of about 6°–15° from the parallel lines of the slab conveying rollers. Preferably, the angle is 10°–15° between and below two of the line rollers. It also has a pair of opposed parallel dross removing blades having their back edges mounted upon the blade support. Preferably, the tops of the blades have an approximately 10° downwardly sloped area. Their front edges have a surface that is approximately 90°, e.g., 0° plus or minus 2° from the sloped area on top. Upon rotation of the blade support from the horizontal position, the downwardly sloped flat top is brought into horizontal contact with the bottom of a slab. The blade holders and the blades are slightly longer than the width of the slab from which the dross is removed. There is at least one vertical dross cutting blade mounted on the blade support at an angle perpendicular to the line of rollers and extending beyond the vertical end of the dross removing blades. The top of this dross cutting blade is machined to be flush with and have the same contour as the dross removing blades.

Also provided is a power source for rotating the spindle. The device can be operated using existing computerized control means employed to control the line of rollers or a dedicated computerized control of its own. Due to the angled position of the apparatus, the dross removing blades are positioned so that the vertical ends shave the dross from the ends of the slabs as a continuous sliver or strip. The computerized control means are programmed to rotate the spindle sufficiently to remove any dross that has fallen on top of the apparatus.

The apparatus has a horizontal leveling mechanism for insuring that the blade support is secure between dross removal cycles. This leveling mechanism is comprised of a vertical disk having a front face and a top and is attached to the spindle between the power source and its bearing. The front face contains a frustro conical horizontal opening that extends partially through the width of the vertical disk. There is also provided a horizontally positioned movable pin having a frustro conical end sized and positioned to engage the frustro conical horizontal opening in the front face in response to a signal from the control means. There are two vertical holes extending partially into the top and the bottom of the vertical disk. These holes are positioned to correspond to the horizontal position of the blade support. They are designed to mate with a stationary hole located above the spindle. Also provided is a manually withdrawable locking pin for engaging the holes in the top of the vertical disk and the stationary hole.

In a preferred embodiment, the invention comprises a pair of blade supports, desirably rectangular in configuration, mounted back to back on gussets attached to the rotatable horizontally positioned spindle. The blade supports at their ends contain a pair of opposed, parallel, spaced apart dross removing blades, having the back edges mounted upon the blade supports. The dross removing blades are preferably made of two or more sections. Each dross cutting blade is comprised of a vertical blade permanently attached to a flat plate in an inverted "T" configuration. This configuration fits into a slot formed between two adjacent sections of the dross removal blades.

In most instances, the control means rotates the dross removing blades about 10° to position their flat top in contact the bottom of the slab. It also positions the blade so that the vertical ends shave the dross from end to end of the slabs as they move on the line of rollers. The control means also rotate the blade supports sufficiently at least 180° to remove any dross that has fallen thereon. Desirably, the front face of the disk contains a pair of opposed frustro conical horizontal openings. These openings mate with a movable horizontally positioned pin having a frustro conical end sized to engage the frustro conical openings in the front face in response to a signal from the control means.

The preferred power source is a hydraulic motor or geared hydraulic motor or electric motor or geared electric motor for rotating the spindle. The existing computer control means or dedicated control means are known to the art as Process Logic Control computers. They are used in most continuous casting operations and are well known and may be programmed to perform a variety of functions. In this invention, the Process Logic Control computer is programmed for rotating and horizontally positioning the dross removing blades. The computer also rotates the blade supports so that the flat top of the dross removal blade contacts the bottom of the slab and is positioned so that the vertical end shaves the dross from end to end of the slabs as they move on the line of rollers. The computer also signals the rotation of the spindle sufficiently to remove any dross that has fallen thereon.

To provide for the accurate horizontal positioning of the blade supports and to prevent rolling of the apparatus so that it will not accidentally strike a slab being or about to be processed, there are provided speed and directional control valves for hydraulic power sources or reversible variable speed control means for electrical power sources. Also utilized is one set of three vertical raised bands located on the side of the vertical disk in the 90° position as measured from the horizontal position of the blade supports. These vertical bands provide input to two sets of three stacked proximity position limit switches. These limit switch sets are located adjacent to each other on opposite sides of the vertical disk. They accurately control the speed and directional control devices to provide rotational slowdown, for either clockwise or counter clockwise rotation of the blade supports just prior to reaching the horizontal position.

The invention further contemplates a method of removing dross from the bottom front and back edges of torch cut slabs of continuous cast steel being conveyed upon a line of rollers. This method comprises positioning against the bottom of the slab a dross removing blade having a flat top and a 90° vertical end and then contacting the dross containing edges of the slab against the vertical end of the blade to cut the dross from the edges. This method further comprises positioning one or more vertical dross cutting blades with a flat top edge against the bottom of the slab for cutting the dross into smaller pieces.

A specific method of the invention uses two parallel, spaced apart, blade supports for removing dross from the bottom front and back edges of torch cut slabs of continuous cast steel being conveyed upon a line of rollers utilizing the apparatus described in the preferred embodiments, and comprising a sequence of the following steps:

positioning the apparatus to place the top blade support containing a pair of dross removing blades in the horizontal position;

passing in one direction a front edge of the slab beyond the apparatus;

rotating the apparatus so that the front edge of one of the dross removing blades is in horizontal contact with the bottom of the slab;

reversing the direction of the slab so that the dross contacts and is removed by the vertical end of the dross removing blade and clears the apparatus;

turning the apparatus at least 180° from the original position and returning it to a horizontal position;

reversing the direction of the slab;

rotating the apparatus so that the front edge of a second dross removing blade is in horizontal contact with the bottom of the slab;

contacting and removing the dross from the back end, with the vertical end of the dross removing blade to provide a dross-free slab;

allowing the dross-free slab to continue past the apparatus on the line of rollers; and turning the apparatus at least 180° from the previous horizontal position.

The method further contemplates that the dross being removed by the dross removing blade is cut into sections by the dross cutting blade. Finally, the vertical disk is locked in the horizontal position between the dross removal steps.

BRIEF DESCRIPTION OF THE DRAWINGS

FIG. 1 is a detailed top plan view showing the dross removal by the apparatus.

FIG. 2 is a side view of the dross removal apparatus.

FIG. 5 is a top plan view showing a drive motor and a bearing assembly having positioned there between a vertical disk containing a frustro conical opening adapted to receive the frustro conical locking pin.

FIGS. 9A–9H shows the sequence of dross removal performed by the apparatus.

In the drawings, like parts have like numbers.

DETAILED DESCRIPTION OF THE INVENTION

Figure 3A:
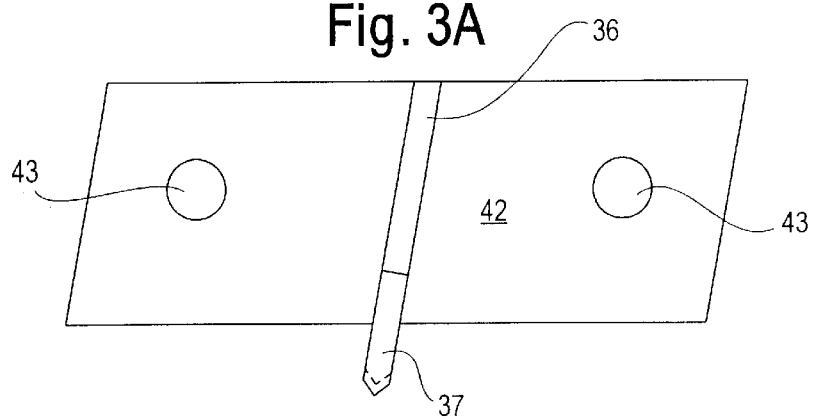
FIGS. 3A–3D are views of the dross cutting blade.
Figure 3B:
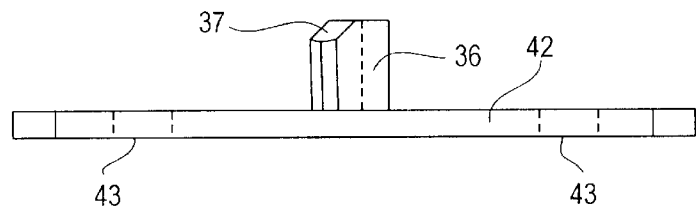
Figure 3C:
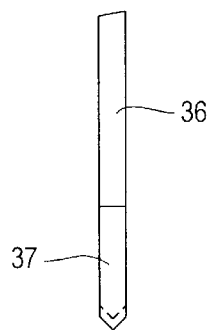
Figure 3D:
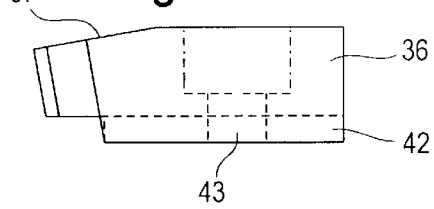

In FIG. 1, there is shown the dross removing apparatus, which is generally designated by the numeral 10. As can be seen in FIGS. 1 and 2, the dross removal apparatus is positioned horizontally between and below two slab conveying rollers 12 and 14. As shown to best advantage in FIG. 2, positioned on top of rollers 12 and 14 and below dross removing apparatus 10, is a steel slab 16. The dross removing apparatus 10 consists of a blade support 18, which is mounted on a spindle 20. The blade support 18 is shown to be rectangular in configuration. Along its longitudinal outer edges, there are fitted dross removing blades 22 that are secured to blade support 18 by bolts 24.

While the back edge 26 of the dross removing blades 22 is mounted on the blade support 18, its front edge 28 has a downwardly sloped flat top 30 and a vertical end 32 which as indicated is approximately 90 degrees (0 degrees–2 degrees), preferably, it is 90 degrees with respect to flat top 30. These features are shown also to be best advantage in FIG. 7. From FIG. 8, it is obvious that when the dross removing apparatus 10 is in the horizontal position, the back edge 26 of the dross removing blade is vertical, whereas the front edge 28 of the dross removing blade is sloped at an angle of about 10 degrees. It is evident that the angle of the front edge 28 of the dross removing blade will vary, depending upon the exact positioning of the dross removing apparatus 10.

In a preferred embodiment of the invention, there are two blade supports 18 mounted in a parallel top and bottom relationship upon spindle 20. The mounting of the blade supports 18 is achieved by means of a plurality of gussets 34, as shown in FIG. 2. FIG. 1 shows mounted in the center of the dross removing blades 22 a vertically mounted dross cutting blade 36.

With specific reference to FIG. 1, the dross removing apparatus 10 is horizontally mounted at an angle ranging between 6°–15° with respect to the slab conveyor rollers 12 and 14. Also shown in FIG. 1 is that the overall length of the blade support 18 is slightly longer than the conveying surface of slab conveyor rollers 12 and 14. FIG. 1, in conjunction with FIGS. 3A–3D, shows that the dross cutting blade 36 is so positioned that it is vertical with respect to the slab conveyor rollers 12 and 14. This configuration allows a smooth cutting of the dross 38 into two or more pieces. As previously discussed, there may be more than one dross cutting blade mounted on the blade support 18.

Figure 7:
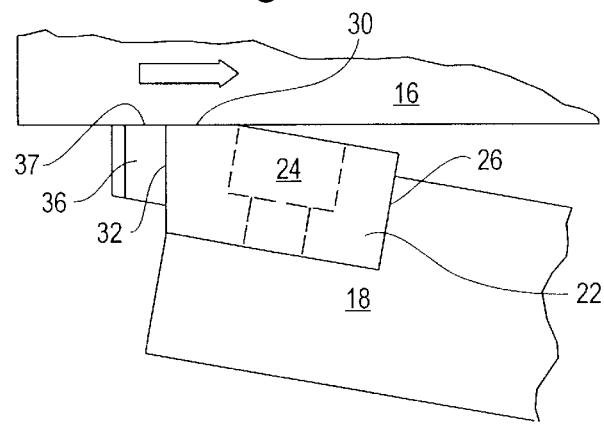
FIG. 7 is a side view showing the dross cutting blade.
Figure 8:
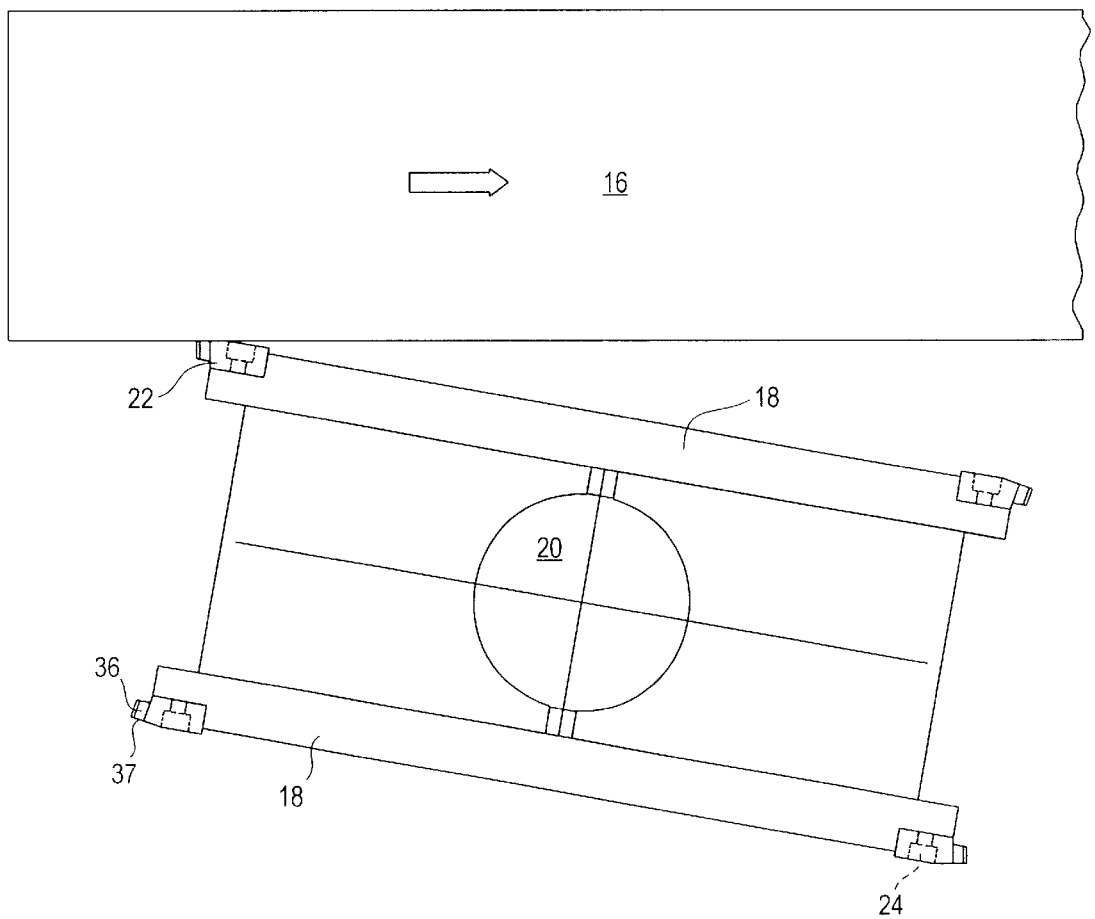
FIG. 8 shows the dross cutting apparatus positioned against a slab just prior to dross removal.

As shown in FIGS. 3A–3D, and FIG. 7, dross cutting blade 36 is mounted on a base plate 42. This base plate is of the same width as the distance between the front edge 32 at its bottom, and back edge 26 of dross removing blades 22. The dross removing blades 22 are desirably in two or more sections, and contain an angled opening adapted to receive base plate 42, which is mounted by bolts 24 through mounting holes 43 to the blade support 18. This mounting feature allows ready replacement of the dross cutting blade 36. In FIG. 7, it is shown that top 37 of the dross cutting blade 36 is flush with the flat top 30 of the dross removal blade 22.

As shown to best advantage in FIGS. 1 and 2, the spindle 20 is journaled in two bearings 44 which are mounted in bearing blocks 45. The bearings may contain ball bearings or roller bearings that allow manual rotation of the entire apparatus. The drive end 46 of spindle 20 is fitted with a drive motor 48. Positioned between the drive motor 48 and the bearings 44 is a vertical disk 50 that is mounted on spindle 20. Vertical disk 50 has a front face 52 and a top 54. Located in the front face 52 are two frustro conical openings 56 that, in a preferred embodiment, do not extend through the width of the disk. There are also two vertical holes 58 and 58A on either side that extend into the width of the disk. One of the vertical holes 58 is preferably positioned at the exact point corresponding to the horizontal position of the blade support 18. Located on a fixed surface above the vertical holes 58 and 58A is a stationary hole 59. The vertical hole in the disk 58 and the stationary hole 59 are engaged by a removable locking pin 59A to prevent the device from moving during periods of maintenance and repair. Preferably, the stationary hole is located in a plate 59B affixed to the bearing cover 45. Optionally, locking plates 59C and 59D are fixed respectively to plate 59B and removable locking pin 59A. Plates 59C and 59D mate to receive a pin or padlock (not shown).

The entire dross removing apparatus 10 is mounted on footings 60 utilizing shear bolts 62. This mounting arrangement allows for accurate leveling, and if the device is accidentally struck by a steel slab 16, the shear bolts 62 snap and allow the device to fall below the level of the bottom of the steel slab 16, thus minimizing damage to the apparatus.

As previously discussed generally, in order to prevent damage, it is necessary that the apparatus be below the path of the steel slab 16 until the proper time in the sequence of operations. To do this requires a means for the Process Logic Control computer to detect when the spindle rotation is in certain areas. The only locations where this position needs to be reasonably accurate is in the two horizontal stop positions. Relying on the motor to stop the rotation in exactly the horizontal position is not adequate. Further, when the slabs are moving along the table rolls, the heavy vibration might cause the mechanism to rotate if material on it is causes an imbalance.

Figure 6A:
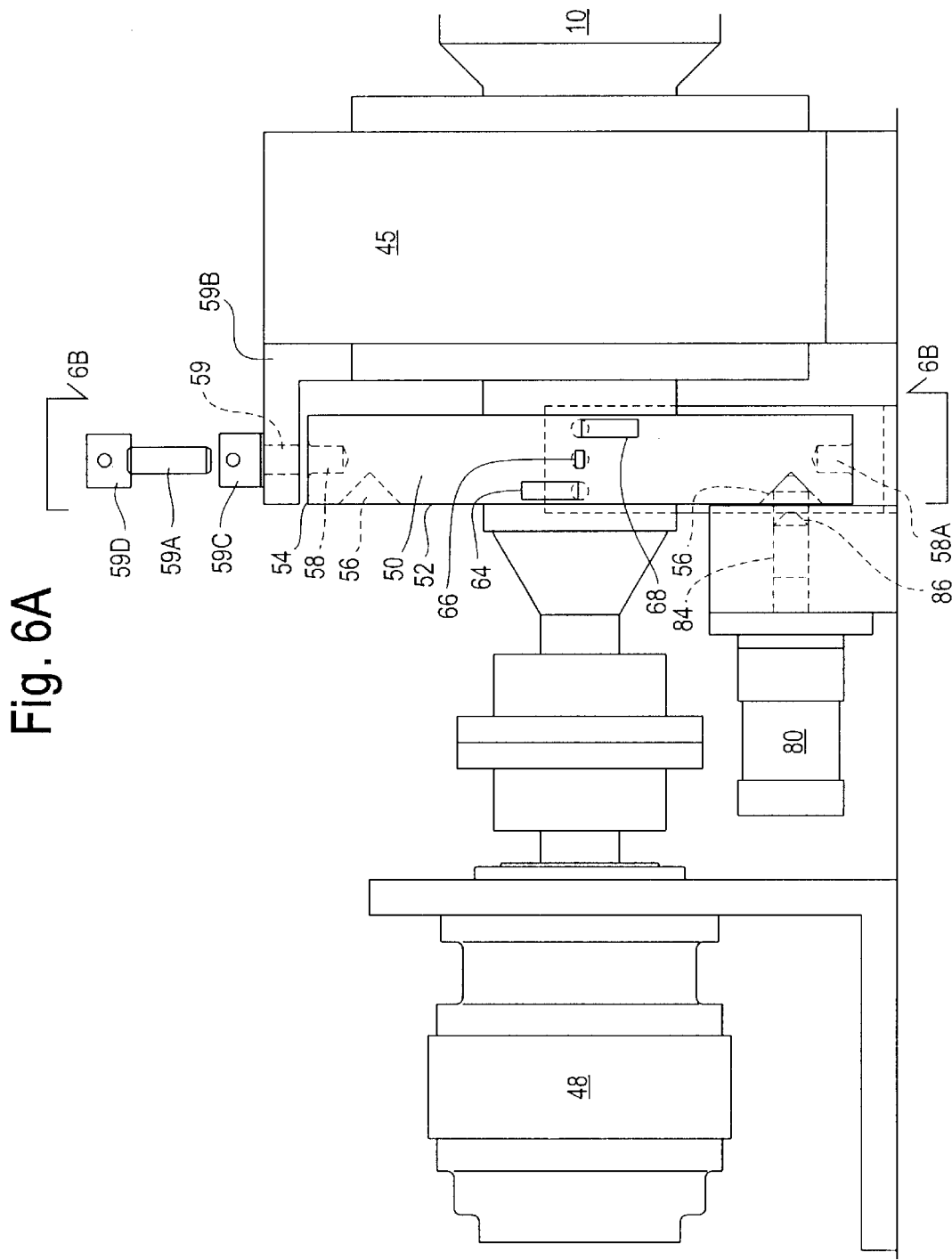
FIG. 6A is a side view showing the manual locking mechanism in detail.
Figure 6B:
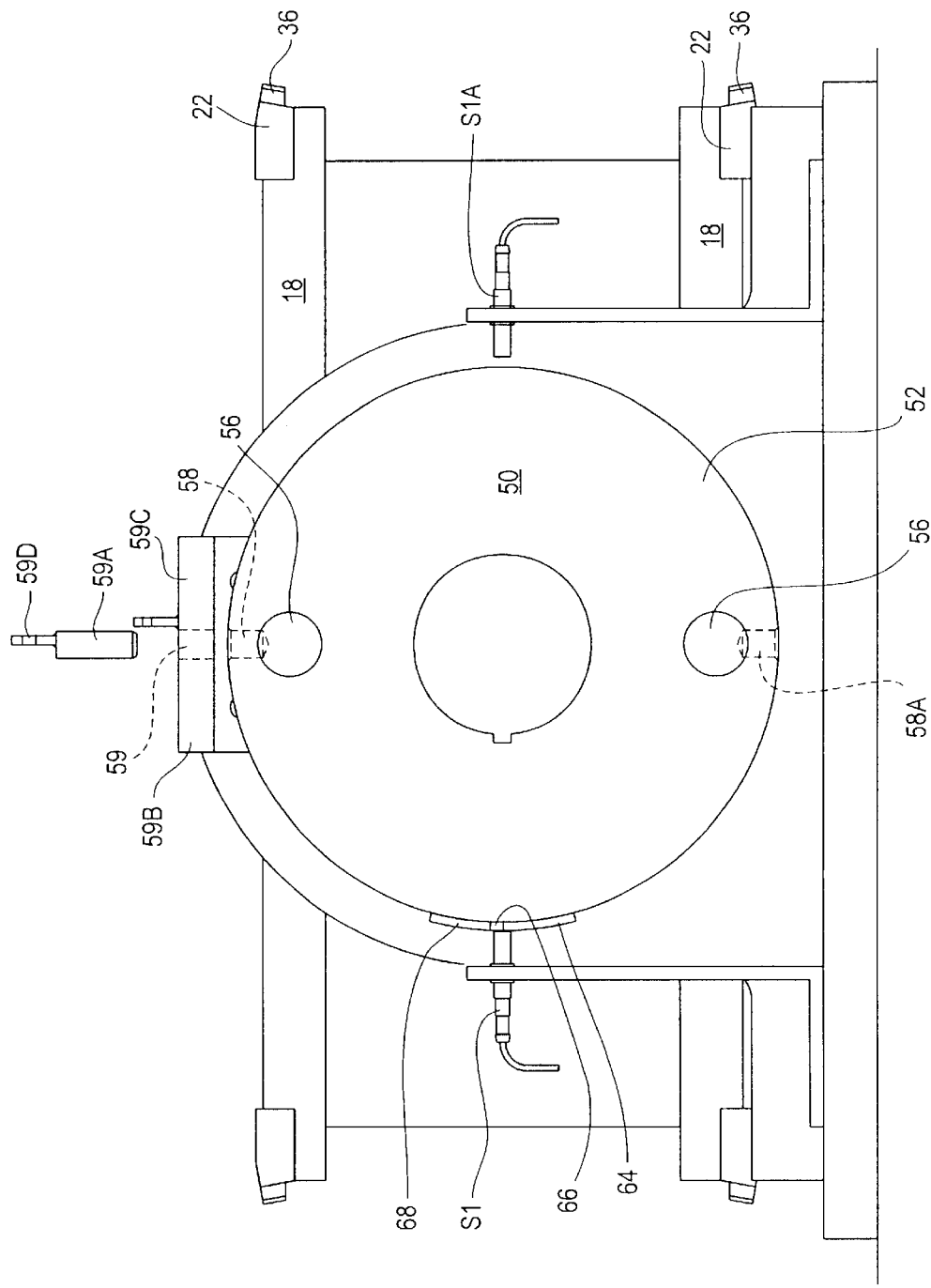
FIG. 6B is taken across the lines 6B of FIG. 6A.

To solve these problems, the invention further provides three raised steel bands 64, 66, and 68 on the side of the diameter of the disk, which are shown in FIGS. 6A and 6B.

The raised steel bands 64, 66, and 68 correspond to the "counter-clockwise slowdown" area, "lever" area and "clockwise slowdown" area, respectively. There are three adjacent proximity position limit switches, mounted on each side of the disk, and are designated as S1, S2, and S3, and S1A, S2A, and S3A. This detail is shown in FIG. 5. The proximity position limit switches are activated by the raised steel bands to give the six needed inputs. Since there is no physical contact, the proximity switches are rated at millons of operations between failures. This arrangement allows exact positioning of the apparatus in the horizontal position.

Figure 4:
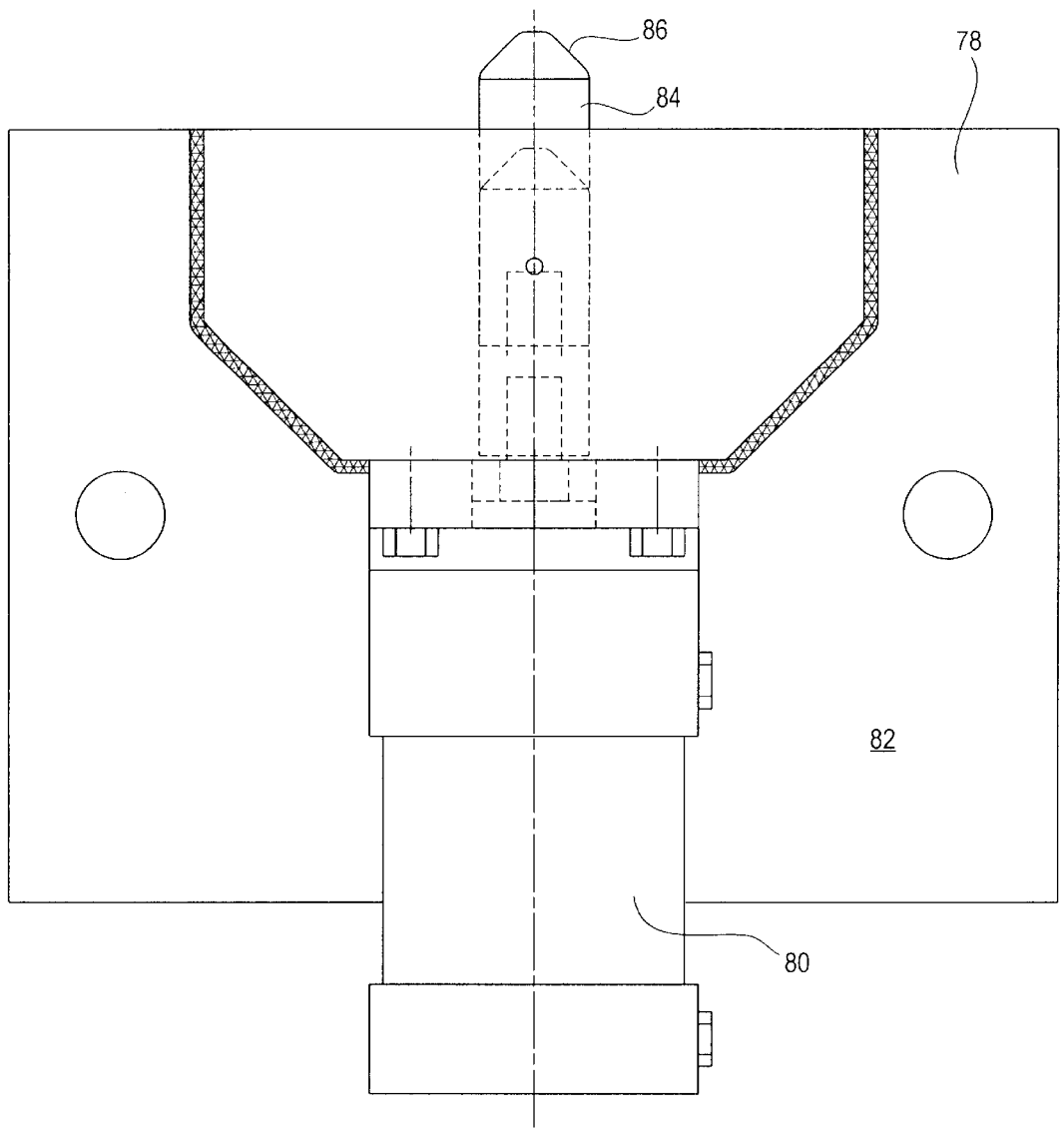
FIG. 4 is a top plan partial cutaway view of the horizontal frustro conical locking pin.

Connected to the main controller is a compressed air driven plunger 78, best illustrated in FIG. 4. It consists of an air operated cylinder 80 mounted under the spindle 20 next to the drive motor 48. The mounting is secured by means of mounting plate 82. The cylinder 80 has a pin 84 having a frustro conical end 86 that is designed to engage with the frustro conical opening 56 located in the front face 52 of vertical disk 50. The frustro conical opening 56 and the frustro conical end 86 of pin 84 are desirably 45 degrees. The pin 84 is parallel to the spindle 20. When the spindle 20 reaches the approximately level position, the air operated cylinder 80 is pressurized by an air solenoid (not shown), and the pin 84 extends and engages frustro conical openings 56 and vertical disk 50. The effect of the 45 degree surface in contact is to center and level the mechanism completely. In the event sufficient outside stress is placed on the mechanism so that it is forced to rotate, the air pressure acts as a cushion, so this centering device will release after resisting without any damage.

Optionally, there are covers over the equipment at each end to prevent a piece of hot product from landing on the apparatus and damaging it. These covers are not shown so that a better understanding of the operation of the apparatus is afforded.

As stated above, the operation is controlled by a Process Logic Control computer. Using only the six inputs detailed above, plus one or more photoelectric or infrared or other sensing devices, such as an optical pyrometer, to detect the slab position, it can initiate the sequence of events necessary for the operation of the apparatus. The photoelectric or infrared or other sensing devices can be those ready present for the operation of an existing Process Logic Control computer.

In practice, the operation of the apparatus to remove dross from the bottom of steel slabs 16 is illustrated in FIGS. 9A–9H. At the start of the cycle, FIG. 9A shows the slab approaching the apparatus in the direction shown by the arrow. The rollers, hereinatfer generally designated as 12A, are moving in a clockwise direction. The dross removing apparatus 10 is in a horizontal position. The slab continues until its front end passes over the dross removing apparatus 10. (See FIG. 9B.) FIG. 9C shows the apparatus to have its right top end tilted in an upward position so that the flat top 30 of the dross removing blade 22 engages the bottom of the steel slab 16. At the same time, the rollers 12A move in a counterclockwise direction, moving the steel slab 16 in the opposite direction. As the slab moves, the dross removing blades 22 are its vertical ends 22 contact and remove the dross.

FIG. 9D shows the slab having passed over the dross removing apparatus 10, which is then rotated at least 180° from the starting horizontal position in a counterclockwise direction and is stopped in the horizontal position. FIG. 9E indicates that the direction of the steel slab 16 is reversed and that is now going in the direction indicated by the arrow. FIG. 9F shows that the slab is passing over the dross removing apparatus 10, which then has its left top end tilted in an upward position so that the flat top 30 of the dross removing blade 22 engages the bottom of the slab 16. The slab 16 continues in the direction indicated by the arrow until the dross containing end contacts the dross removing blade 22 of the apparatus 10. FIG. 9G shows that after the slab 16 has passed over the apparatus 10, the apparatus 10 is rotated at least 180 degrees from the previous horizontal position in a clockwise direction until it reaches the horizontal position shown in FIG. 9H. This completes one cycle, which is repeated for each slab 16 that passes over the apparatus.

An important aspect of the invention is the two 180° rotations of the apparatus, shown in FIGS. 9D and 9G. This rotation is important, since any dross 38 hung up on the top of blade support 18 falls from the apparatus into a dross recovery pit (not shown).

Perhaps the most important feature of the invention resides in that the vertical end 32 of the dross removing blade 22 is at 90 degrees and the downward sloped flat top 30 of dross removal blades 22 and the top 37 of dross cutting blade 36 are flat against the bottom of the steel slab 16. This configuration eliminates or minimizes the removal of any steel other than the dross 38 from the slab. This is because no gouging or nicking of the steel slab 16 occurs during the dross removal. Further, this configuration of the dross removing blades is what permits the addition of at least one vertical dross cutting blade, which would otherwise be even more prone to gouging the bottom of the slab.

We claim:

1. An apparatus for removing dross from the bottom front and back edges of torch cut slabs of continuous cast steel being conveyed upon a line of rollers which comprises:

at least one blade support mounted upon a rotatable spindle located and journaled in bearings at an interior angle of about 6°–15° between and below two of the line rollers;

a pair of opposed parallel dross removing blades having their back edges mounted upon the blade support and their front edges having a downwardly sloped flat top and about a 90° vertical end which upon rotation of the blade support from a horizontal position the downwardly sloped flat top is in horizontal contact with the bottom of a slab;

at least one vertical dross cutting blade mounted on the blade support at an angle perpendicular to the line of rollers and extending beyond the vertical end of the dross removing blades;

a power source for rotating the spindle; and, control means for rotating the dross removing blades to have their flat top horizontally contact the bottom of the slab and be positioned so that the vertical ends shave the dross from the ends of slabs as they move on the line of rollers and to rotate the spindle sufficiently to remove any dross which has fallen thereon.

2. The apparatus of claim 1, having a horizontal position lock which comprises:

a vertical disk having a front face and a top attached to the spindle between the power source and its bearing with the front face containing a frustro conical horizontal opening;

a horizontally positioned pin having a frustro conical end sized to engage the opening in the front face in response to a signal from the control means.

3. The apparatus of claim 2, where there are two vertical holes extending partially into the width of the vertical disk which holes are positioned to mate with a stationary hole and a manual locking pin for engaging the holes in the vertical disk and the stationary hole.

4. The apparatus of claim 3, where the stationary hole is in a plate mounted on the motor side of the bearing block.

5. An apparatus for removing dross from the bottom front and back edges of torch cut slabs of continuous cast steel being conveyed upon a line of rollers which comprises:

a pair of blade supports mounted back to back upon and separated by a rotatable spindle located and journaled in bearings at an interior angle of about 6°–15° between and below two adjacent line rollers;

a pair of opposed parallel dross removing blades having their back edges mounted upon the blade supports and their front edges having a downwardly sloped flat top having about a 90° vertical end, which upon rotation of the blade support from the horizontal position, the downwardly sloped flat top is in horizontal contact with the bottom of a slab;

at least one vertical dross cutting blade mounted on the blade supports at an angle perpendicular to the line of rollers, being flush therewith, and extending beyond the vertical end of the dross removing blades;

a power source for rotating the spindle; and, control means for rotating the dross removing blades to have their flat top contact the bottom of the slab and be positioned so that the vertical ends shave the dross from the ends of slabs as they move on the line of rollers and to rotate the spindle sufficiently to remove any dross which has fallen thereon.

6. The apparatus of claim 5, having a horizontal position lock which comprises:

a vertical disk having a front face and sides, with a top and bottom attached to the spindle between the power source and its bearing, with the front face containing a pair of opposed frustro conical horizontal openings;

a horizontally positioned pin having a frustro conical end sized to engage the frustro conical openings in the front face in response to a signal from the control means.

7. The apparatus of claim 6, where there are two vertical holes extending partially into the vertical disk, which holes are positioned to mate with a stationary hole and a locking pin for engaging the holes in the vertical disk and the stationary hole.

8. The apparatus of claim 7, where the stationary hole is in a plate mounted on the motor side of the bearing block.

9. The apparatus of claim 5, where the blade supports are rectangular.

10. The apparatus of claim 5, where the dross removing blades are sectional.

11. The apparatus of claim 5, where the dross cutting blades are supported by a permanently attached flat plate in an inverted T configuration that fits into a slot formed between two adjacent sections of the dross removal blades.

12. The apparatus of claim 5, where the interior angle is about 10°–15°.

13. An apparatus for removing dross from the bottom front and back edges of torch cut slabs of continuous cast steel being conveyed upon a line of rollers which comprises:

a pair of blade supports mounted back to back upon and separated by a rotatable spindle located and journaled in bearings at an interior angle of about 6°–15° between and below two adjacent line rollers;

a pair of opposed parallel dross removing blades having their back edges mounted upon the blade supports and their front edges having a downwardly sloped flat top, having a 90° vertical end which upon rotation of the blade support from the horizontal position, the downwardly sloped flat top is in horizontal contact with the bottom of a slab;

at least one vertical dross cutting blade mounted on the blade supports at an angle perpendicular to the line of rollers and extending beyond the vertical end of the dross removing blades;

a drive motor for rotating the spindle;

computer control means for rotating the dross removing blades to have their flat top contact the bottom of the slab and be positioned so that the vertical ends shave the dross from the ends of slabs as they move on the line of rollers and to rotate the spindle sufficiently to remove any dross which has fallen thereon; and, a system for accurately aligning the blade support in a horizontal position comprising:

a means of directional and speed control for the motor;

one set of three raised vertical bands located on the side of the vertical disk corresponding to the horizontal position of the blade supports to provide input to two sets of three proximity position limit switches, which sets are located adjacent to each other on opposite sides of the vertical disk to accurately control the speed and the direction and the rotational slowdown for either clockwise or counter clockwise rotation of the blade supports just prior to reaching the horizontal position.

14. The apparatus of claim 13, where the interior angle is about 10°–15°.

15. A method of removing dross from the bottom of the front and back edges of the width of torch cut slabs of continuous cast steel which slabs are being conveyed upon a line of rollers which comprises rotating into position against the bottom of the slab a flat top dross removing blade having at least one section and a length slightly longer than the width of the slab: and a 90° vertical end and then moving the slab on the line of rollers to contact the dross containing edges of the slab against the 90 degree vertical end of the dross removing blade to cut the dross from the edges.

16. The method of claim 15 where the dross removing blade is at an interior angle of about 6 degrees–15 degrees with respect to the line of rollers.

17. The method of claim 15 where the dross removing blade has attached thereto a vertical dross cutting blade that is positioned perpendicular to the line of rollers.

18. A method of removing dross from the bottom front and back edges of torch cut slabs of continuous cast steel being conveyed upon a line of rollers utilizing the apparatus of claim 5, which comprises a sequence having the steps:

positioning the apparatus of claim 5 to place the top blade support containing a pair of dross removing blades in the horizontal position;

passing in one direction a front edge of the slab beyond the apparatus;

rotating the apparatus so that the front edge of one of the dross removing blade is in horizontal contact with the bottom of the slab;

reversing the direction of the slab so that the dross contacts and is removed by the vertical end of the dross removing blade and clears the apparatus;

turning the apparatus at least 180° from the original horizontal position;

reversing the direction of the slab;

rotating the apparatus so that the front edge of a second dross removing blade is in horizontal contact with the bottom of the slab;

contacting and removing the dross from the back end with the vertical end of the dross removing blade;

allowing the dross free slab to continue past the apparatus on the line of rollers;

turning the apparatus at least 180° from the previous horizontal position to return the apparatus to the horizontal position.

19. The method of removing dross of claim 18, where the dross being removed by the dross removing blade is cut into sections by the dross cutting blade.

20. The method of claim 18, where the vertical disk is locked in the horizontal position between the dross removal steps.

* * * * *